United States Patent [19]

Perakis et al.

[11] 4,314,657
[45] Feb. 9, 1982

[54] MEASURING DISPENSER

[75] Inventors: Mike Perakis, 1740 N. Atlantic Ave., Daytona, Fla. 32018; Henry J. DeBenedictis, Ormand Beach, FL

[73] Assignee: Mike Perakis, Daytona Beach, Fla.

[21] Appl. No.: 164,595

[22] Filed: Jun. 30, 1980

[51] Int. Cl.³ .............................................. G01F 11/28
[52] U.S. Cl. .................................. 222/162; 141/305; 222/442; 222/453
[58] Field of Search ................ 141/302, 305; 222/162, 222/365, 442, 451, 453

[56] References Cited

U.S. PATENT DOCUMENTS

| | | |
|---|---|---|
| 966,270 | 8/1910 | Van Leir . |
| 2,197,142 | 4/1940 | Cannon et al. . |
| 2,248,958 | 7/1941 | Christonsen et al. . |
| 2,580,292 | 12/1951 | Geary et al. . |
| 2,820,579 | 1/1958 | Roth . |
| 2,980,302 | 4/1961 | Rosmussen . |
| 3,128,915 | 4/1964 | Matter . |
| 3,141,585 | 7/1964 | Emmert . |
| 3,321,113 | 5/1967 | Corny . |
| 3,351,239 | 11/1967 | Flock ................................... 222/162 |
| 3,630,419 | 12/1971 | Pierce . |
| 4,180,106 | 12/1977 | Coetzee ........................ 222/365 X |

Primary Examiner—David A. Scherbel
Attorney, Agent, or Firm—Arthur G. Yeager

[57] ABSTRACT

The measuring dispenser includes a fixed assembly having liquid and air passages an external guide, a slidable assembly having pouring, measuring and connecting chambers and an internal guide slidably sealed on the external guide to slidably mount theslidable assembly on the fixed assembly. A valve assembly is actuated by the slidable assembly which is spring biased to a normal position closing the outlet valve for sealed storage and measuring. A manual operator adjacent the guide and top of the bottle provides for convenient signle hand gripping of the bottle and manual operation to move the slidable assembly to its dispensing position. The valve assembly functions to push liquid to initiate dispensing pouring flow from the measuring chamber. An external air vent is connected only to the pouring chamber, and an improved connecting chamber with air passage and liquid passage to maintain separated liquid and air flows to avoid air lock between the dispenser and bottle are also provided.

21 Claims, 4 Drawing Figures

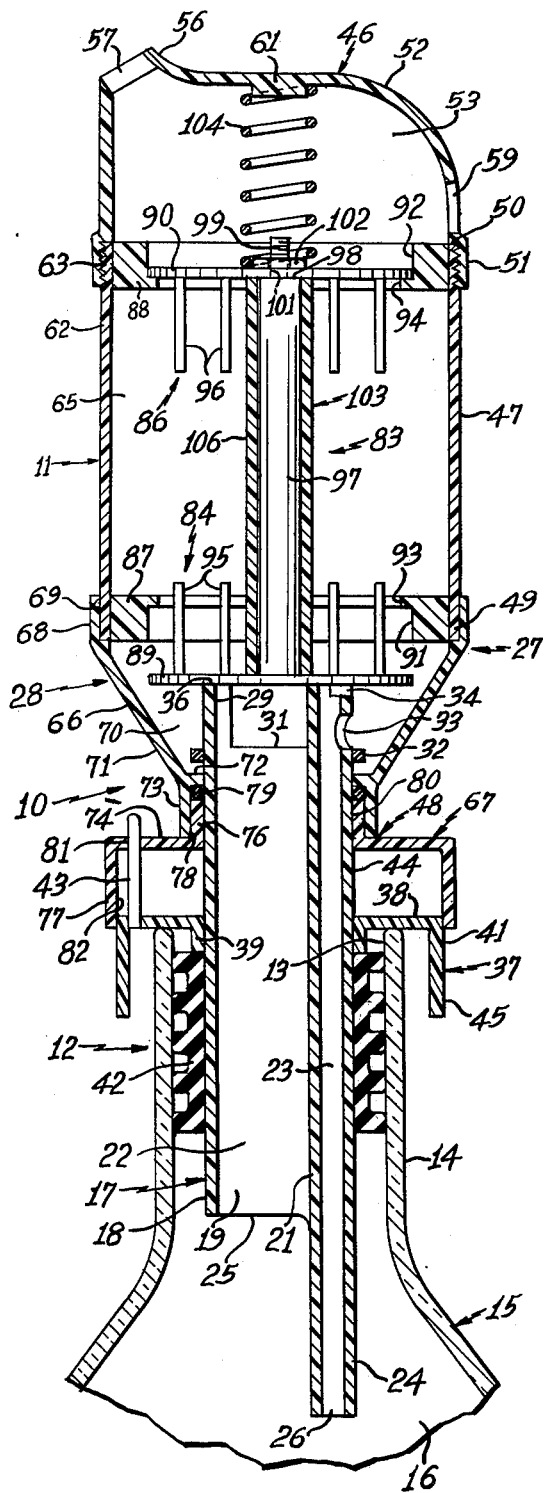
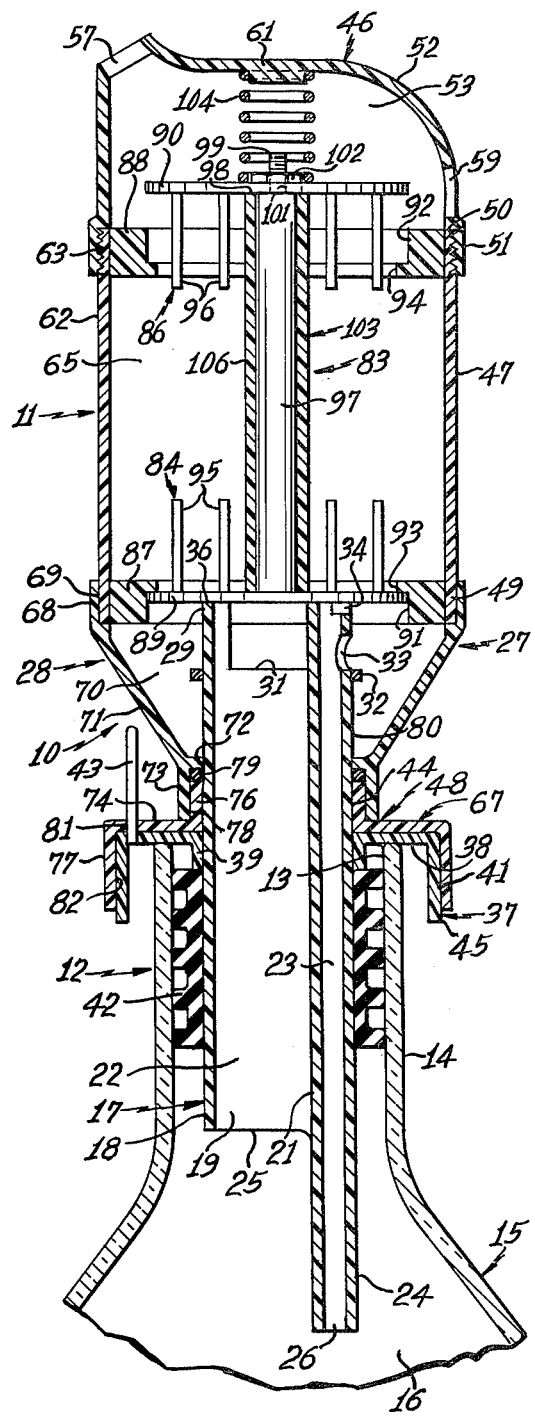

MEASURING DISPENSER

SUMMARY OF THE INVENTION

My invention relates to measuring dispensers and, more particularly, to liquid measuring dispensers of the type attached to a storage container to pour a measured quantity of liquid.

My improved measuring dispenser is attached to the pouring opening of a known storage container or bottle of the type that is grasped by the neck to nearly invert both the storage container and measuring dispenser to pouring position for convenient operation to rapidly pour a measured quantity of liquid.

My measuring dispenser has a sturdy, simple and inexpensive improved construction having a fixed assembly adapted to be attached to a bottle at its pouring opening, a slidable assembly mounted externally on the fixed assembly for limited non-rotary axial sliding movement, a valve disc assembly having inlet and outlet discs connected together in fixed spaced relation by a rod and cooperating respectively with inlet and outlet seals attached inside the slidable assembly, to provide inlet and outlet valves and a spring compressed between and biasing the slidable assembly to a normal limit position in which the inlet valve is fully open and the outlet valve is fully closed. The fixed assembly has an attaching member for attaching and sealing it to the bottle at the pouring opening, an external guide portion at the top of the bottle, and a pouring tube with liquid and air passages extending through the attaching member and guide portion. The slidable assembly has a centrally located measuring chamber between the valve seals, a cover having a pouring spout and an external air vent at the top beyond the outlet valve and a connecting member providing a connecting chamber at the bottom below the inlet valve and having at its bottom end an internal guide portion fitting the external guide portion on the fixed assembly to slidably mount the slidable assembly on the fixed assembly for limited sliding movement between normal and dispensing positions. The valve disc assembly in the normal and dispensing positions has its inlet valve disc abutting the top of the pouring tube of the fixed assembly so it does not normally move relative to the fixed assembly.

The air passage, first and second lateral air vent holes in the pouring tube connecting the air passage to the bottom and top of the connecting chamber and the external air vent are all located on the upper side in pouring position. The liquid passage, a lateral opening in the pouring tube connecting the liquid passage to the connecting chamber are all located on the lower side in pouring position. Each valve seal has a cylindrical seat located at the outer side with respect to the measuring chamber and having a sliding seal with its valve disc and an annular seat located at the inner side facing the measuring chamber and having an abutting seal with its disc providing a liquid and air tight or full seal and limiting further movement.

The connecting portion has an external laterally extending substantially annular manual operating member, which is preferably an annular part of the connecting portion between an upper small diameter guide portion and a lower larger diameter guide portion, located at the top of the bottle.

When the bottle is in upright storage position and the measuring dispenser is in normal position due to the spring reacting through the disc assembly on the fixed assembly and biasing the slidable assembly upwardly to the normal position, the outlet valve is closed so external air does not enter the measuring chamber and the inlet valve is open so the measuring chamber is connected to the bottle. Thus, contamination and evaporation causing loss of liquid and valve sticking is inhibited and the measuring dispenser is positioned for the measuring phase of the pouring operation. To pour a measured quantity of liquid, the pourer grasps the neck of the bottle and only inverts the bottle and measuring dispenser to pouring position. Then the liquid in the bottle flows rapidly through the liquid passage and lower side of the connecting chamber to fill the measuring chamber and displace the air therein for separated free flow through the upper side of the connecting chamber and air passage for return to the bottle. When the measuring chamber is full, the pourer uses his thumb to move the manual operating member which moves the slidable assembly in the dispensing movement from normal position to dispensing position. During dispensing movement in a first phase, the inlet valve seal moves so its cylindrical seat initially starts to seal with the inlet valve disc and at the same time the outlet valve seal moves so its cylindrical seat initially moves past the outlet valve disc. Thus, when the inlet valve initially closes to stop flow from the bottle to the measuring chamber, the outlet valve simultaneously initially opens to start flow from the measuring chamber to the pouring spout. Then in a second phase, the inlet valve cylindrical seat moves across inlet disc and outlet valve seal moves further past the outlet disc to fully open the outlet valve to bodily move the measured volume of liquid in the measuring chamber toward the pouring chamber to manually move the liquid to rapidly start pouring flow from the measuring chamber to the pouring chamber in the cover. Then in a third phase, when the inlet valve annular seat engages its disc to stop movement of the slidable assembly and fully close the inlet valve and fully open the outlet valve, there is rapid gravity induced pouring flow to empty the measuring and pouring chambers through the spout as air freely enters through the external air vent to fill the pouring and measuring chambers. When the pourer releases the slidable assembly, it is returned by the spring to normal position for another pouring operation or for storage.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which:

FIG. 1 is a cross section view of the measurer dispenser with the slidable and fixed assemblies in normal position.

FIG. 2 is a cross section view of the measurer dispenser with the slidable and fixed assemblies in dispensing pouring position.

DETAILED DESCRIPTION OF INVENTION

Figure 3:
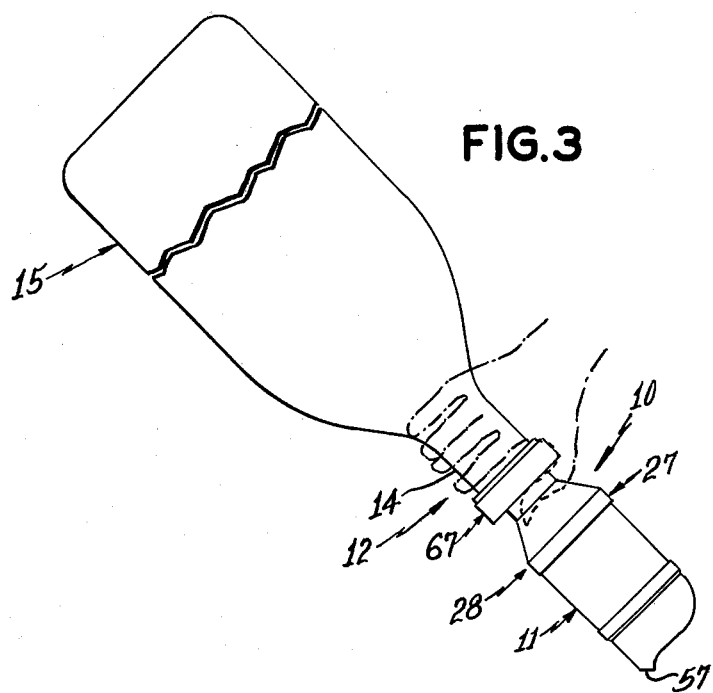
FIG. 3 is an elevation view of the measurer dispenser and bottle as held during a pouring operation.

As shown in the drawing, the measuring dispenser 10 has a slidable assembly 11 slidably mounted on a fixed assembly 12. The fixed assembly 12 is attached and sealed at the pouring opening 13 on the neck 14 of a known storage container or bottle 15, which is nearly inverted to pouring position, FIG. 3, to pour liquid from storage or bottle chamber 16 through pouring opening 13 and measuring dispenser 10 into a receiving container (not shown).

In the measuring dispenser 10, the fixed assembly 12 has a pouring tube 17, preferably cylindrical, having a tube wall 18 enclosing a tube bore 19. A dividing wall 21 is secured and sealed in tube bore 19 and extends longitudinally through tube bore 19 to divide the tube bore 19 into a liquid passage 22 having a large cross section area and an air passage 23 having a relatively small cross section area. A tube wall portion 24 and dividing wall 21 forming air passage 23 extend beyond the lower inlet end 25 of liquid passage 22 so the lower open end 26 of air passage 23 is nearer the bottom of storage chamber 16. As pointed out below, when measuring dispenser 10 is tilted and inverted for pouring, air passage 23 is at the upper side 27 and liquid passage 22 is at the lower side 28 of pouring tube 17 and measuring dispenser 10.

At the outlet end 29 of pouring tube 17, there is an opposed pair of outlet openings 31, preferably recessed in the outlet end 29 of pouring tube 17, extending transversely from dividing wall 21 to near lower side 28 of pouring tube 17. Thus liquid passage 22 and outlet openings 31 provide liquid passage means with axial and lateral portions connecting bottle chamber 16 to connecting chamber 70. A stop ring 32 is secured to the external surface of tube wall 18 or at slightly below the lower edge of outlet openings 31. A large area first air vent 33 extends through tube wall 18 at upper side 27 into air passage 23. The first air vent 33 is at the top edge of stop ring 32 and preferably extends above the lower edge of outlet openings 31. A small area second air vent 34, a notch, extends through tube wall 18 at the top outlet end 29 and upper side 27 into air passage 23. Air passage 23 and first and second air vents 33, 34 provide air passage means with an axial portion and a first lateral portion at the bottom of connecting chamber 70 and a second lateral portion at the top of connecting chamber 70. The remaining portions of outlet end 29 of tube wall 18 and the end of dividing wall 21 provide a flat transverse abutment 36 having several portions engaging the bottom of inlet valve disc 89 during all normal phases of operation as described below.

A cap member 37 has an annular top 38 with an internal flange 39 secured to tube wall 18 and an external flange 41. Both flanges 39, 41 extend downwardly. An annular stopper 42 fits on tube wall 18 and in the neck 14 of bottle 15 to secure and seal fixed assembly 12 on bottle 15. The annular top 38 abuts the top of neck 14 and external flange 41 fits over the neck 14 with clearance. A guide pin 43 is secured to annular top 38 and extends upwardly parallel to tube wall 18. The tube wall 18 in the space between annular top 38 of cap member 37 and stop ring 32 provides a cylindrical first external guide surface 44. Guide pin 43, first guide surface 44 and a second external guide surface 45 on flange 41 are used as described below to slidably mount slidable assembly 11 on fixed assembly 12.

In the measuring dispenser 10, the slidable assembly 11 has a pouring cover 46, a measuring container 47 and connecting portion 48 which are secured together to form slidable assembly 11 as a unitary assembly. The slidable assembly 11 is mounted by its connecting portion 48 on tube wall 18 of fixed assembly 12 for sliding movement from a normal position shown in FIG. 1 to a dispensing position shown in FIG. 2 as further described below.

The pouring cover 46 has a cylindrical flange 51 and a dome top 52 enclosing, in cooperation with outlet valve 86, a pouring chamber 53. At the lower side 28, dome top 52 has a spout 56 leading to pouring hole 57. At the opposite upper side 27 near flange 51, the dome top 52 has external air vent 59, the only air vent connecting the interior of measuring dispenser 10 to atmosphere. A spring guide 61 is fixed by integral construction or other attachment to the internal surface of dome top 52 at the center. Flange 51 and cylindrical wall 62 of measuring container 47 have screw threads 63 to detachably secure and seal pouring cover 46 to measuring container 47. Measuring container 47 and inlet and outlet valves 84, 86 respectively at the bottom inlet end 49 and the top outlet end 50 of measuring container 47 define measuring chamber 65.

The connecting portion 48 has a tapered member 66 and a guide member 67. The tapered member 66 has a cylindrical flange 68 secured and sealed by securing means 69, such as adhesive or threads, to cylindrical wall 62 of measuring container 47, a tapered wall 71, preferably frusto conical, connecting flange 68 to annular flange 72 and cylindrical flange 73. The guide member 67 has an annular portion 74 with an internal flange 76 fitting within and secured to cylindrical flange 73 by securing means such as adhesive or threads to secure guide member 67 to tapered member 66. Internal flange 76 is shorter than cylindrical flange 73 to provide a space for O-ring seal 79 which provides a sliding seal between connecting portion 48 and first guide surface 44 of tube wall 18. The tapered member 66 provides a connecting chamber 70 around the outlet end 29 of pouring tube 17 and below inlet valve 84. The internal surfaces of annular flange 72 and the internal flange 76 facing tube wall 18 provide a first internal guide surface 80 having free sliding and guiding clearance with first external guide surface 44 on tube wall 18. The external flange 77 of guide member 67 provides a second internal guide surface 82 having a free sliding and guiding clearance with the facing cylindrical second internal guide surface 45 on external flange 41 of cap member 37. This construction provides axially spaced large diameter guide portions for free sliding movement of slidable portion 12 on fixed assembly 11 without significant lateral movement. The guide pin 43 extends through guide hole 81 in annular portion 74 of guide member 67 to prevent relative rotary movement of sliding assembly 11 and fixed assembly 12. Movement of slidable assembly 11 at the normal position or a tolerance distance beyond normal position, a manual position, is maximally limited by annular flange 72 of connecting portion 48 engaging stop ring 32. Opposite movement of slidable assembly 11 at the dispensing position is limited by annular portion 74 of connecting portion 48 engaging annular top 38 of cap member 37 and inlet valve 84 in fully closed position.

The valve assembly 83 has an inlet valve 84 and an outlet valve 86 respectively having similar or identical annular seals 87, 88 and valve discs 89, 90. The annular seals 87, 88 respectively have cylindrical seats 91, 92 and at one side annular seats 93, 94. Each valve disc fits its cylindrical seat with a small clearance for free sliding movement and provides a sufficient low head seal for the required operation. When each valve disc seats on its annular seal there is a liquid and air tight seal limiting movement. The valve discs 89, 90 respective have a plurality of spaced, preferably six equally spaced, guide pins 95, 96 located near the perimeter and contacting the inner edge of their respective annular seat 93, 94 in all valve disc positions to guide the valve discs so they can enter their cylindrical seat 91, 92.

In the inlet valve 84, the seal 87 is secured and sealed by adhesive to the inside of cylindrical wall 62 at the lower edge with the annular seat 93 on the top side and disc 89 below annular seat 93. In the outlet valve 86, the seal 88 is secured and sealed to the inside of cylindrical wall 62 at the top edge with annular seat 94 on the lower side and disc 90 above annular seat 94. Thus inlet and outlet seals 87, 88 are respectively at inlet and outlet ends 49, 50 of measuring container 47 and measuring chamber 65 and respectively have inlet and outlet annular seats 93, 94 at the inner side and inlet and outlet cylindrical seats 91, 92 at the outer side facing inlet and outlet discs 89, 90.

Valve rod 97 is secured by integral construction or adhesive to the center of inlet valve disc 89 and has at the upper end a shoulder 98 and an integral smaller diameter post 99. The outlet valve disc 90 has a central aperture 101 fitting on post 99. A nut 102, of the threaded or push type, is secured on post 99 to hold disc 90 against shoulder 98 and thus fixed to valve rod 97. Thus, valve rod 97 is secured to valve discs 89, 90 to form a valve disc assembly 103 so the valve discs are held in aligned position at a right angle to rod 97. The valve discs 89, 90 and valve seals 87, 88 are spaced apart the distance required to fully open one valve when the other valve is closed. The distance between the outer edge of cylindrical seats 91, 92 and the distance between the inner edges of discs 89, 90 are the same or substantially the same. A compression spring 104 is seated on spring guide 61 on pouring cover 46 and on post 99 in compression between valve disc assembly 103 and pouring cover 46 of slidable portion 11 to bias valve disc assembly 103 so the bottom surface of inlet valve disc 89 is normally in contact with the abutment 36 on outlet end 29 of pouring tube 17 of fixed assembly 12. Thus, valve disc assembly 103 normally has a fixed position like fixed assembly 12 to provide a reaction so compression spring 104 biases slidable assembly 11 to the normal position in which outlet annular seat 94 engages outlet valve disc 90 to close outlet valve 86 and inlet valve 84 is fully open. In the normal position annular flange 72 abuts or is spaced a small clearance distance from stop ring 32. If slidable assembly 11 is pulled up with an abnormal force, such as to lift bottle 15 or to remove measuring dispenser 10 from bottle 15, slidable assembly 11 and valve disc assembly 103 may move together a small clearance distance until annular flange 72 engages stop ring 32 to prevent further movement of slidable assembly 11 relative to fixed assembly 12 in a manually set position. In this manually set position, inlet valve disc 89 is spaced the same small distance from abutment 36.

A cylindrical tube filler member 106 is slidably mounted on valve rod 97 and held in position by valve discs 89, 90. The measuring chamber 65 will hold the maximum measured volume of liquid without a filler. The pouring cover 46, nut 102 and outlet valve disc 90 are removed to slip one or another filler member 106 on valve rod 97 and then reassembled for measuring a reduced volume of liquid.

OPERATION

In the above described normal and manually set positions of measuring dispenser 10, compression spring 104 biases outlet valve 86 to fully closed position and inlet valve 84 to fully open position. When the measuring dispenser 10 and bottle 15 are in the upright storage position, atmospheric air communicates via external air vent 59 and spout 56 with pouring chamber 53 and is blocked by fully closed outlet valve 86. The measuring chamber 65 and connecting chamber 70 are filled with air initially on attaching the measuring dispenser 10 to bottle 15 and thereafter when each dispensing operation is completed. The pouring tube 17 and bottle chamber 16 are also filled with air above the liquid level. In pouring tube 17, liquid passage 22 and air passage 23, due to air vents 33, 34, have no liquid above the liquid level.

Outlet valve 86 is fully closed and air tight in the normal and manually set positions encountered when bottle 15 with measuring dispenser 10 attached, is stored. Thus, atmospheric air will not enter measuring chamber 65 and cause dust or other foreign matter to contaminate the liquid in measuring and bottle chambers 65, 16. The evaporation of liquid in measuring chamber 65, connecting chamber 70 and the bottle chamber 16 is substantially prevented and these chambers stay moist, so the liquid does not dry and cause deposits which would cause the valves to stick. Thus, this measuring dispenser 10 will pour all types of free flowing liquids including whiskey and liquor with a sugar content without sticking.

When it is desired to pour a measured quantity of liquid, bottle 15 is grasped by the hand, gripping the neck 14 and inverted to a pouring position, about 45°, FIG. 3, placing measuring dispenser 10 below bottle 15 with the upper side 27 of measuring dispenser 10 at the top. The liquid immediately flows at a high rate through liquid passage 22, outlet openings 31, the lower portion of connecting chamber 70 and open inlet valve 84 to fill measuring chamber 65. Air is displaced from measuring chamber 65 through the top portion of connecting chamber 70, both air vents 33, 34 and air passage 23 to the bottom of bottle chamber 16 (now at the top) for rapid high volume air flow to provide rapid liquid flow to fill measuring chamber 65. It is important that air passage 23 and air vents 33, 34 be on upper side 27 and liquid passage 22 and openings 31 be on lower side 28 and that first and second air vents 33, 34 be connected to the bottom and top of connecting chamber 70 to maintain separation between liquid and air flow to avoid turbulence and air lock which would reduce the rate of liquid flow and to provide a sufficient air passage for rapid liquid flow.

Since in the pouring position, the first air vent 33 is at the top of connecting chamber 70, the first air vent 33 especially functions for complete filling of the measuring chamber 65.

Then to dispense the measured quantity of liquid, the pourer, such as a bartender, with his free thumb engages annular portion 74, a manual operating portion, of guide member 67 to move slidable assembly 11 toward fixed assembly 12. If the slidable assembly 11 is in the manually set position, compression spring 104 causes valve disc assembly 103 to move with slidable assembly 11 to the normal position in which inlet valve disc 89 engages abutment 36 on fixed assembly 12 so valve disc assembly 103 is in a fixed position. Further dispensing movement, preferably a rapid movement, of slidable assembly 11 moves valve seals 87, 88 relative to fixed valve disc assembly 103 so inlet valve 84 closes and outlet valve 86 opens. When outlet valve disc 90 leaves its cylindrical seat 92 and starts to open or is slightly open, the inlet valve disc 89 simultaneously enters its cylindrical seat 91 to start to close. As inlet valve disc 89 moves across its cylindrical seat 91 to fully closed position engaging its annular seat 93, inlet valve disc 89 is substantially sealed and pushes the liquid in the measuring chamber 65 through outlet valve 86 toward and partially to pouring chamber 53 to manually initiate liquid movement to rapidly initiate pouring flow out of pouring hole 57. Liquid flow from connecting chamber 70 to measuring chamber 65 is stopped when inlet valve disc 89 enters its cylindrical seat 91 so only the measured quantity of liquid between previously closed outlet valve 86 and the bottom of inlet valve seat 87 is dispensed. During pouring atmospheric air enters through external air vent 59 to pouring chamber 53 and measuring chamber 65 so there is free rapid flow of the liquid to pour the measured quantity. When the inlet valve disc 89 approaches or engages its annular seat 93 closing inlet valve 84, the annular portion 74 of guide member 67 engages annular top 38 of cap member 37 providing stop means to positively limit dispensing movement in a maximum open dispensing position so inlet valve disc 89 and seat 87 are not damaged. During dispensing movement guide pin 43 and guide hole 81 provide guide means so slidable assembly 11 with its spout 56 cannot turn relative to fixed assembly 12 and storage container or bottle 15.

On completing this pouring, the pourer relieves the manual or thumb pressure on annular portion 74, permitting compression spring 104, which reacts through valve disc assembly 103 abutting abutment 36 on fixed assembly 12, to return slidable assembly 11 to the above described normal position. If the measuring dispenser 10 and bottle 15 remain in pouring position, the measuring chamber 65 will refill as described above. If the measuring dispenser 10 and bottle 15 are returned to storage position, any liquid in measuring container 65 and the liquid in connecting chamber 70 will drain through outlet openings 31 and liquid passage 22 to storage chamber 16 and air will flow up air passage 23 and out of second air vent 34 to replace the draining liquid or the liquid will drain through first air vent 33 and air passage 23 and air will return through liquid passage 22 with second air vent 34 helping so all the liquid drains from air passage 23 to the liquid level in storage chamber 16, so this measuring dispensing device is in proper condition for the next rapid measuring and pouring cycle.

In the above description top and bottom or upper and lower, etc. have been used for convenient reference to describe the location of parts as shown in FIGS. 1 and 2 and are inverted in pouring position FIG. 3. The upper side 27 and lower side 28 as identified in FIGS. 1 and 2 is required to be position as shown in FIG. 3 for proper operation.

Figure 4:
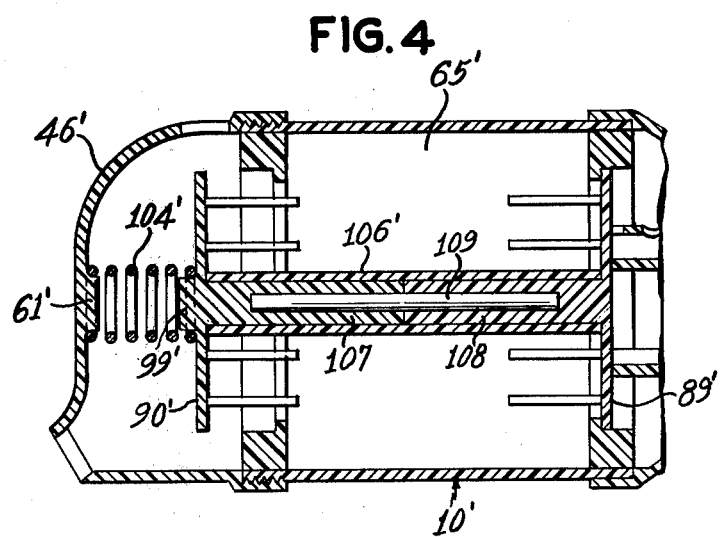
FIG. 4 is a partial view of an alternative embodiment of the dispenser invention of FIG. 1.

In FIG. 4 an alternative embodiment of dispenser 10' is depicted with the primed reference characters representing corresponding elements of the dispenser of FIGS. 1-3. Rather than a nut 102 threaded onto post 99, in FIGS. 1-3, an enlarged post 99' may be affixed to valve disc 90' or be molded integral therewith to support guide spring 104'. Hollow posts 107 and 108 are affixed or integrally molded to respective valve discs 90' and 89'. Telescoping within the hollows of posts 107 and 108 is an enlongated pin 109 which is rigidly affixed to one of the posts 107 and 108 and slidable into the other of such posts. Thus, when pouring cover 46', the spring 104', valve disc 90' are removed (and if pin 109 is affixed to post 107, it will also be removed), filler member 106' may be removed and replaced with a larger or smaller filler member whereby to alter the measured volume within the chamber 65'.

Air vent 33, cooperatively with air vent 34, permits the air to be displaced from chamber 65 through passage 23 and into the bottle 15. If some liquid happens to fall into the open end 26 of air passageway or passage 23, or if liquid were tending to clog or interfere with the air flow through air vent 33, the air vent 34 is provided to augment air vent 33 and to clear liquid from passage 23 and/or from air vent 33. While the measurer dispenser in accordance with this invention operates very well without the air vent 34 it appears that the addition of the air vent 34, spaced from air vent 33, at the end of the passage 23 further inhibits the hesitation of liquid flow when the pouring of the liquid is initiated.

While the lower edge of outlet openings 31 and the lower edge of air vent 33 are shown in FIGS. 1 and 2 as being laterally aligned, the lower edge 31 preferably should be closely adjacent to or below annular flange 72 so that any liquid remaining in the connecting chamber 70, after return of the bottle 15 with dispenser 10 attached, will flow back into the bottle 15 via slots 31 and liquid passage 22. Such construction will additionally assist in maintaining the air vent 33 and/or air vent 34 clear from liquid obstruction for the free passage of air between chamber 70 and bottle chamber 16.

In comparison to other commercial measurer dispensers, the disclosed invention herein measures and dispenses liquid more accurately and at a higher rate of speed of pouring which substantially approaches the speed at which a single one (1) ounce shot is poured from a quart bottle. Even more impressive is when a bartender pours one (1) ounce shots from a quart bottle as fast as he can, dumping the shots in glasses open side up. The approximate time for a free pour from the bottle is one (1) minute and fifteen (15) to twenty (20) seconds. The same bartender with the measurer dispenser in accord with this invention can emply a quart bottle into the same glasses in one (1) ounce shot increments in one (1) minute and two (2) to eight (8) seconds.

The annular stopper 42 and O-ring 79 are made of known soft flexible rubber-like or plastic materials. The other parts except for spring 104 are made of known rigid plastic material. The pouring cover and measuring container are preferably transparent. The materials selected are inert and do not deteriorate in the liquid being poured.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a liquid measuring dispenser: a fixed assembly having a tube with a top portion and a bottom portion; abutment means on said top portion of said tube; external guide means on said tube spaced below said abutment means; attaching means secured and sealed to said tube between said top and bottom portions and immediately adjacent said external guide means adapted for securing and sealing said fixed assembly to a storage container with said tube extending through a pouring opening to locate said bottom portion in the storage container; air passage means and liquid passage means, each having an axial portion extending axially through said tube and a lateral portion extending between said abutment means and said external guide means respectively at the upper side and the lower side in inverted pouring position: a slidable assembly including a container with inlet and outlet ends having a central measuring chamber, a pouring chamber at said outlet end, and a connecting chamber at said inlet end surrounding said lateral portions of said air and liquid passage means in said tube; said container having a pouring hole at its lower side and an external air hole at said upper side connected to said pouring chamber; internal guide means secured and sealed to said container at said inlet end and axially slidably mounted on and sealed to said external guide means to mount said slidable assembly for limited axial sliding movement on and relative to said fixed assembly and a manual operator member attached to said container at said inlet end and projecting laterally outward for manually sliding said slidable assembly relative to said fixed assembly from a normal position toward said bottom portion of said tube to a dispensing position; valve means including an inlet valve between said connecting and measuring chambers and an outlet valve between said measuring and pouring chambers; said inlet valve and outlet valve respectively having an inlet seal and an outlet seal mounted and sealed on the inside of said container at the oppositely located inlet and outlet openings of said measuring chamber and an inlet disc and an outlet disc; rod and guide means connecting said inlet and outlet discs and maintaining alignment for seating with said respective inlet and outlet seals forming a disc assembly and spring means compressed between said container and disc assembly and coacting with said rod and guide means to maintain said discs in fixed spaced relation with said disc assembly normally abutting said abutment means to provide reaction for raising said slidable assembly away from said bottom end of said tube to normal position, closing said outlet valve and opening said inlet valve, to fill said measuring chamber when in inverted pouring position and on manually moving said manual operator member and slidable assembly toward said bottom end against the bias of said spring means to dispensing position closing said inlet valve and opening said outlet valve to pour a measured quantity of liquid when in inverted pouring position.

2. The invention defined in claim 1 and said outlet seal having an annular seat engaging said outlet disc in said normal position to limit sliding movement of said slidable assembly by said spring means in said normal position.

3. The invention defined in claim 1 and said abutment means being a portion of the top end surface of said tube, said lateral portion of said liquid passage means being openings extending from said top end surface to said external guide means and generally the length of said connecting chamber and said lateral portion of said air passage means being a first hole adjacent said external guide means and thus at the bottom of said connecting chamber and a second hole adjacent said inlet valve disc at the top of said connecting chamber.

4. The invention defined in claim 1 and said connecting chamber having a large diameter at the end adjacent said measuring chamber and a smaller diameter at the opposite end closely fitting said tube, said attaching means having a cap member with an annular portion secured to said tube and adapted to engage the top of a storage container and a depending flange portion, said external guide means having a first external guide surface of small diameter provided by the external surface of said tube and a second external guide surface of larger diameter provided by said depending flange and said internal guide means having a first internal guide member of small diameter secured to said opposite end of said connecting chamber and a second internal guide member of larger diameter slidably mounted respectively on said first and second external guide surfaces and an annular member connecting said first and second internal guide members and providing said manual operator member.

5. The invention defined in claim 1 and said inlet and outlet seals on said inside having a sliding seal fit with said inlet and outlet discs and have respectively inlet and outlet annular seats on the inner side having abutting management with said inlet and outlet discs for a full seal stopping closing movement; the distance between said discs and the distance between the outer side edge of said cylindrical seats is substantially the same; said valve means in normal position is biased by said spring means so said outlet annular seat engages said outlet disc to fully close said outlet valve and stop movement and fully open said inlet valve and on manual movement to dispensing position in a first phase, said inlet cylindrical seat initally engages, in a second phase, moves across said inlet disc and then, in a third phase said inlet annular seat engages said inlet disc to fully close said inlet valve and stop movement and at substantially the same phase time, in said first phase, said outlet cylindrical seat disengages said outlet disc, in said second phase moves past said outlet disc to, in said third phase, fully open said outlet valve to successively, in said first phase, close said measuring chamber to determine the measured quantity of liquid to, in said second phase, manually move the measured quantity of liquid toward and partially into said pouring chamber to rapidly start pouring flow for, in said third phase, rapid gravity pouring flow through said pouring hole.

6. In a liquid measuring dispenser: a fixed assembly having a tube with an abutment end at the top and a port end at the bottom; a stop ring secured externally to said tube in spaced relation below said abutment end; attaching means secured externally to said tube in spaced relation below said stop ring, including a cap member having an annular part adapted for seating on the top of a storage container, for attaching and sealing said fixed assembly to a storage container; a first external guide surface of small diameter on said tube between said stop ring and cap member; said cap member having a second external guide surface of larger diameter extending below said annular part; liquid passage means in said tube including a liquid passage extending through said tube from said abutment end to a liquid port at said port end and a lateral opening in said tube from said liquid passage between said abutment end and stop ring both on the lower side in the inverted pouring position; and air passage means including an air passage extending through said tube from said abutment end to beyond said liquid port to an air port, a first lateral hole in said tube from said air passage immediately above said stop ring and a second lateral hole in said tube from said air passage at said abutment end all on the upper side in inverted pouring position: a slidable assembly including a measuring container with oppositely open inlet and outlet ends providing a measuring chamber; a cover having a pouring hole at said lower side and an external air hole at said upper side detachably secured and sealed to said outlet end and providing a pouring chamber; and a connecting portion having a conical container with a large end being open and secured and sealed to said inlet end and a small end providing a connecting chamber enclosing said tube between said abutment end and said stop ring, first guide means secured and sealed to and extending below said small end, surrounding said tube and slidably mounted and sealed on said first external guide surface for slidable movement, limited by said stop ring and said cap member, of said slidable assembly on said fixed assembly, an annular member secured at its inner diameter to the lower end of said first guide means and extending laterally outward to provide a manual operator just above said cap member and second guide means secured to said annular member at the outer portion, extending below said outer member and slibably mounted on said second external guide surface: valve means comprising an inlet valve and an outlet valve respectively located at said inlet and outlet ends of said measuring container and having respectively inlet and outlet discs located at said inlet and outlet ends and inlet and outlet seals secured and sealed inside said measuring container at said inlet and outlet ends and located between said inlet and outlet discs with inlet and outlet cylindrical seats on the outer side for initially engaging said inlet and outlet discs with a sliding seal and with inlet and outlet annular seats engaging said inlet and outlet discs to stop closing movement in fully closed position, rod means detachably secured to and holding said inlet and outlet discs against movement toward each other in fixed spaced relation providing a disc assembly, a tubular filler selectably mounted on said rod means between said discs to variably predetermine the measured quantity of liquid, a spring compressed between said outlet disc and cover for biasing said disc assembly so said inlet disc normally engages said abutment end of said tube and for biasing said slidable assembly to a normal position with said outlet annular seat engaging said outlet disc to limit movement and fully close said outlet valve and fully open said inlet valve so in the inverted pouring position liquid rapidly flows through said liquid passage means and the lower side of said connecting chamber to fill said measuring chamber as air returns through the upper side of said connecting chamber and said air passage means and on manually moving said annular member to move said slidable assembly against the bias of said spring and inlet valve is initially closed when said inlet cylindrical seat initially engages said inlet disc and substantially simultaneously said outlet valve is initially open when said outlet cylindrical seat initially disengages said outlet disc to stop filling and determine the measured quantity of liquid and then with continued movement said inlet cylindrical seat slides across said inlet disc until said inlet annular seat engages said inlet disc to limit movement and fully close said inlet valve and simultaneously said outlet valve is fully opened so manual movement of said slidable assembly initiates rapid bodily transfer of the measured quantity of liquid from said measuring chamber toward and partially into said pouring chamber to manually start liquid movement to obtain rapid gravity flow out of said pouring hole and replacement air flow through said external air hole.

7. In a liquid measuring dispenser; a fixed assembly having an elongated tube with top and bottom portions, releasable attaching means surrounding said tube between said top and bottom portions for securing and sealing said fixed assembly to a storage compartment with said tube extending through a pouring opening of the compartment to locate said bottom portion in the storage compartment, air passage means and liquid passage means respectively having an elongated axial portion extending longitudinally through said tube and a lateral portion; a slidable assembly including an elongated container with inlet and outlet end portions and a central measuring chamber therebetween, a pouring chamber adjacent the end of said outlet end portion, and a connecting chamber at said inlet end portion communicating with said lateral portions of said air and liquid passage means, said pouring chamber of said container having a pouring hole at the lower side of said container in inverted pouring position of said dispenser and an external air hole at the upper side of said container; means for moveably mounting said slidable assembly for limited axial sliding movement on and relative to said fixed assembly from a normal position toward said bottom portion of said tube to a dispensing position; valve assembly means including an inlet valve between said connecting and measuring chambers and an outlet valve between said measuring and pouring chambers; means for coupling said inlet and outlet valves for simultaneously and oppositely opening and closing movements upon sliding of said slidable assembly with respect to said fixed assembly, and spring means between said container and said valve assembly means for biasing said valve assembly means toward said top portion of said tube to provide reaction for raising said slidable assembly away from said bottom portion of said tube to normal position, closing said outlet valve and opening said inlet valve, to fill said measuring chamber when said dispenser is in inverted pouring position and on moving said slidable assembly toward said bottom portion of said tube against the bias of said spring means to dispensing position closing said inlet valve and opening said outlet valve to pour a measured quantity of liquid out through said pouring chamber pouring hole when in inverted pouring position.

8. The invention defined in claim 7 wherein said means for movably mounting said slidable assembly includes internal guide means secured and sealed to said container adjacent said inlet end portion, external guide means on said tube adjacent said top portion thereof, said internal guide means being axially slidably mounted on and sealed to said external guide means.

9. The invention defined in claim 8 wherein said lateral portion of said liquid passage means having openings extending from said tube top end portion to adjacent said external guide means, said lateral portion of said air passage means being a first hole adjacently above said external guide means and above the bottom of said connecting chamber and a second hole adjacent said inlet valve adjacent the top of said connecting chamber.

10. The invention defined in claim 8 wherein said connecting chamber includes a large diameter at the end thereof adjacent said measuring chamber and a smaller diameter at the opposite end closely fitting said tube, said releasable attaching means having a cap member with an annular portion secured to said tube and adapted to engage the top of a storage compartment and a depending flange portion, said external guide means having a first external guide surface of small diameter provided by the external surface of said tube and a second external guide surface of larger diameter provided by said depending flange, said internal guide means having a first internal guide member of small diameter secured to said opposite end of said connecting chamber and a second internal guide member of larger diameter slidably mounted respectively on said first and second external guide surfaces, and an annular member connecting said first and second internal guide members for providing a manual operator member for manually sliding said slidable assembly relative to said fixed assembly.

11. The invention defined in claim 7 wherein said dispenser further comprises a manual operator member attached to said container adjacent said inlet portion and projecting outwardly therefrom for manually sliding said slidable assembly relative to said fixed assembly.

12. The invention as defined in claim 7 wherein said inlet valve and outlet valve respectively include an inlet seal and an outlet seal mounted and sealed on the internal wall of said container at oppositely located inlet and outlet openings of said measuring chamber, said inlet and outlet valves respectively having an inlet disc and an outlet disc, said means for coupling including rod and guide means for simultaneously moving and guiding said inlet and outlet valve discs for seating same with respective said inlet and outlet seals.

13. The invention defined in claim 7 wherein said inlet and outlet cylindrical seats on the outer side include a sliding seal fit with said inlet and outlet discs and having respectively inlet and outlet annular seats on the inner side having abutting management with said inlet and outlet discs for a full seal stopping closing movement; the distance between said discs and the distance between the outer side edge of said cylindrical seats being substantially the same; said valve assembly means in normal position being biased by said spring means so said outlet annular seat engages said outlet disc to fully close said outlet valve and stop movement and fully open said inlet valve, and on manual movement to dispensing position in a first phase, said inlet cylindrical seat initially engages, in a second phase, moves across said inlet disc and then, in a third phase said inlet annular seat engages said inlet disc to fully close said inlet valve and stop movement and at substantially the same phase time, in said first phase, said outlet cylindrical seat disengages said outlet disc, in said second phase moves past said outlet disc, in said third phase, to open fully said outlet valve to close successively, in said first phase, said measuring chamber to determine the measured quantity of liquid, in said second phase, to move manually the measured quantity of liquid toward and partially into said pouring chamber to rapidly start pouring flow, in said third phase, for rapid gravity pouring flow through said pouring hole.

14. The invention defined in claim 7 wherein said outlet seal includes an annular seat engaging said outlet disc in said normal position to limit sliding movement of said slidable assembly by said spring means in said normal position.

15. The invention as defined in claim 7 wherein said means for coupling said inlet and outlet valves includes a rod in said measuring chamber generally centrally located between said valves, further comprising a selectively replaceable filler member having an opening therethrough adapted for assembly thereof on said rod with said rod passing through said filler member opening whereby the volume of liquid in said measuring chamber may be selectively varied.

16. The invention as defined in claim 7 wherein said means for coupling said inlet and outlet valves includes a rod rigidly attached to one of said valves, means for selectively detaching the other of said valves to said rod.

17. The invention as defined in claim 7 wherein said means for coupling said inlet and outlet valves includes a rod attached to each said valve, telescoping connection means for attaching said valve rods together within said measuring chamber.

18. The invention as defined in claim 7 wherein said liquid passage means lateral portion substantially communicates with said connecting chamber closely adjacent the lower extent of said connecting chamber when said dispenser is in its upright normal position whereby liquid within said connecting chamber may be returned therethrough by gravity through said liquid passage means into the compartment.

19. The invention as defined in claim 7 wherein said air passage means lateral portion substantially communicates with said connecting chamber closely adjacent the lower extent of said connecting chamber when said dispenser is in its upright normal position whereby liquid within said connecting chamber may be returned therethrough by gravity through said air passage means into the compartment.

20. The invention as defined in claim 19 wherein said air passage means includes another lateral portion above said lateral portion and adjacent the upper extent of said axial portion for assuring that air will enter said air passage means in event of liquid interference with said lateral portion during at least initial flow of liquid from said compartment into said connecting chamber.

21. The invention as defined in claim 7 wherein said air and liquid passage means lateral portions substantially communicate with said connecting chamber closely adjacent the lower extent of said connecting chamber when said dispenser is in its upright normal position whereby liquid within said connecting chamber may be returned therethrough by gravity through said air and liquid passage means into the compartment.

* * * * *